US006493606B2

(12) United States Patent
Saijo et al.

(10) Patent No.: US 6,493,606 B2
(45) Date of Patent: Dec. 10, 2002

(54) ARTICULATED ROBOT AND METHOD OF CONTROLLING THE MOTION OF THE SAME

(75) Inventors: Hiroki Saijo, Chiba (JP); Yoshihiro Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 57 days.

(21) Appl. No.: 09/812,312

(22) Filed: Mar. 20, 2001

(65) Prior Publication Data

US 2001/0047226 A1 Nov. 29, 2001

(30) Foreign Application Priority Data

Mar. 21, 2000 (JP) .......................................... 2000-078979

(51) Int. Cl.[7] .............................................. G05B 19/00
(52) U.S. Cl. ........................ 700/245; 700/246; 700/247; 700/251; 700/253; 700/256; 700/260; 700/261; 318/568.1; 318/568.11; 318/568.12; 318/568.16; 318/568.17; 318/568.2; 901/1; 901/9; 901/46; 901/47; 701/23
(58) Field of Search .......................... 700/56, 245, 246, 700/247, 251, 253, 258, 260, 261; 701/23; 318/568.1, 568.2, 568.11, 568.12, 568.16, 568.17; 901/1, 9, 46, 47; 180/8.6, 8.1

(56) References Cited

U.S. PATENT DOCUMENTS

| 5,369,346 A | * | 11/1994 | Takahashi et al. | ..... | 318/568.17 |
|---|---|---|---|---|---|
| 5,402,050 A | * | 3/1995 | Ozawa | ................... | 318/568.12 |
| 5,416,393 A | * | 5/1995 | Gomi et al. | ................. | 700/245 |
| 5,594,644 A | * | 1/1997 | Hasegawa et al. | .......... | 700/246 |
| 5,737,217 A | * | 4/1998 | Nishikawa et al. | ......... | 700/258 |
| 5,823,845 A | * | 10/1998 | O'Berrigan | ................. | 446/234 |
| 5,872,893 A | * | 2/1999 | Takenaka et al. | ............ | 700/245 |
| 5,982,389 A | * | 11/1999 | Guenter et al. | ............. | 345/474 |
| 6,021,363 A | * | 2/2000 | Nishikawa et al. | ......... | 700/253 |
| 2002/0007230 A1 | * | 1/2002 | Ueno et al. | ................. | 700/245 |

FOREIGN PATENT DOCUMENTS

| EP | 1 103 451 A2 | * | 5/2001 |
|---|---|---|---|
| JP | 04 210393 | | 7/1992 |
| JP | 08 318053 | | 12/1996 |

OTHER PUBLICATIONS

Hirai et al., The development of Honda humanoid robot, 1998, IEEE, pp. 1321–1326.*

Inaba et al., Two–armed bipedal robot tha can walk, roll over and stand up, 1995, IEEE, pp. 297–302.*

Hirai et al., Current and future perspective of Honda humanoid robot, 1997, IEEE, pp. 500–508.*

(List continued on next page.)

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer

(57) ABSTRACT

A legged mobile robot realizes a motion language by a time-series change in an actuator angle or a motion pattern using the four limbs and the trunk. A motion language which includes, for example, a motion pattern which is an approximation of the contour/shape of a character is used, so that even a robot or a human being which does not possess the same motion language database can determine the meaning and character which is indicated by each motion pattern as a result of visually recognizing and interpreting the contour/form which is indicated by each motion pattern. For example, a robot which has stepped into a dangerous working area can give a message concerning, for example, the condition of the working area to an observer at a remote location without using any data communications device. The legged mobile robot communicates by moving the limbs and/or the trunk.

14 Claims, 14 Drawing Sheets

OTHER PUBLICATIONS

Konno et al., Development of a light–weight biped humoinoid robot, 2000, IEEE, pp. 1565–1570.*

Hara F et al: "Real–time facial interaction between human and 3D face robot agent" Robot and Human Communication, 1996., 5th IEEE International Workshop on Tsukuba, Japan Nov. 11–14, 1996, New York, NY, USA,IEEE, US, Nov. 11, 1996, pp. 401–409, XP010212871 ISBN: 0–7803–3253–9.

Mizoguchi H et al: "Behavioral expression by an expressive mobile robot–expressing vividness, mental distance, and attention" Intelligent Robots and Systems, 1997. IROS '97., Proceedings of the 1997 IEEE/RSJ International Conference on Grenoble, France Sep. 7–11, 1997, New York, NY, USA,IEEE, US, Sep. 7, 1997, pp. 306–311, XP010264665 ISBN: 0–7803–4119–8.

* cited by examiner 100
(BACK)

100
(DEGREE-OF-FREEDOM
STRUCTURE MODEL)

ARTICULATED ROBOT AND METHOD OF CONTROLLING THE MOTION OF THE SAME

BACKGROUND OF THE INVENTION

1. Field of the Invention

The present invention relates to an articulated robot like a legged robot having at least limbs and a trunk, and a method of controlling the motion of the articulated robot, and, more particularly, to a legged robot which executes various motion patterns by using the limbs and/or the trunk, and a method of controlling the motion of the legged robot.

Still more particularly, the present invention relates to a legged robot which communicates by moving the limbs and/or the trunk, and a method of controlling the motion of the legged robot. Even still more particularly, the present invention relates to a legged robot which comes to an understanding through various motion patterns making use of the limbs and/or the trunk, and a method of controlling the motion of the legged robot.

2. Description of the Related Art

A robot is a mechanical device which emulates the motion of a human being by making use of electrical and magnetic actions. The term robot is said to be derived from the Slavic word ROBOTA (slavish machine). In our country, the widespread use of robots began from the end of the 1960s, many of which were industrial robots, such as manipulators and conveyance robots, used, for example, for the purpose of achieving automatic industrial operations in factories without humans in attendance.

Installation-type robots, such as arm-type robots, which are provided so as to be implanted at a particular place function only in fixed/localized working spaces for carrying out parts assembly/sorting and the like. In contrast, mobile robots can function in unlimited working spaces, so that they can freely move in predetermined paths or pathless areas in order to perform in place of human beings a predetermined or a desired human task, or to provide various wide-ranging services in place of living beings such as humans and dogs. Of the mobile robots, legged mobile robots are unstable compared to crawler-type robots and wheeled robots, so that it becomes difficult to control their posture and walking. However, legged mobile robots are excellent robots in that they can move up and down steps and ladders, go over obstacles, and walk/run flexibly regardless of whether the ground is leveled or unleveled.

In recent years, advances have been made in the research and development of legged mobile robots such as pet robots and humanoid robots, with pet robots emulating the mechanism of the body of an animal which moves using four legs, such as a dog or a cat, and the motion thereof, and with humanoid robots being designed using as a model the mechanism of the body of an animal which moves erect using two legs, such as a human being, and the motion thereof. Therefore, there is increasing expectations for putting such robots into practical use.

The significance of carrying out research and development on legged mobile robots called humanoid robots can be understood from, for example, the following two viewpoints.

The first viewpoint is related to human science. More specifically, through the process of making a robot having a structure which is similar to that having lower limbs and/or upper limbs of human beings, thinking up a method of controlling the same, and simulating the walking of a human being, the mechanism of the natural motion of a human being, such as walking, can be ergonomically understood. The results of such research can considerably contribute to the development of other various research fields which treat human motion mechanisms, such as ergonomics, rehabilitation engineering, and sports science.

The other viewpoint is related to the development of practical robots as partners of human beings which help them in life, that is, help them in various human activities in situations in living environments and in various other situations in everyday life. Functionally, in various aspects of the living environment of human beings, these robots need to be further developed by learning methods of adapting to environments and acting in accordance with human beings which have different personalities and characters while being taught by human beings. Here, it is believed that making the form and structure of the robot the same as those of a human being is effective in achieving smooth communication between the robot and a human being.

For example, when teaching a robot a way of passing through a room by avoiding obstacles which should not be stepped on, it is much easier for the user (worker) to teach it to a robot which walks using two legs having the same form as the user than a crawler-type or a robot which walks using four legs having a completely different structure from the user. In this case, it must also be easier for the robot to learn it (Refer to, for example, "Controlling a Robot Which Walks Using Two Legs" by Takanishi (Jidosha Gijutsukai Kanto Shibu <Koso> No. Apr. 25, 1996).

The working space and living space of human beings are formed in accordance with the behavioral mode and the body mechanism of a human being which walks erect using two legs. In other words, for moving present wheeled mechanical systems or other such driving devices as moving means, the living space of human beings has too many obstacles. It is preferable that the movable range of the robot be about the same as that of human beings in order for the mechanical system, that is, the robot to carry out various human tasks in place of them, and to deeply penetrate the living space of human beings. This is the reason why there are great expectations for putting a legged mobile robot into practical use. In order to increase the capability of the robot to exist harmoniously in the living environment of human beings, it is essential for the robot to possess a human form.

Humanoid robots can be used to carry out various difficult operations, such as in industrial tasks or production work, in place of human beings. They carry out in place of human beings dangerous or difficult operations at places where human beings cannot easily step into, such as maintenance work at nuclear power plants, thermal power plants, or petrochemical plants, parts transportation/assembly operations in manufacturing plants, cleaning of tall buildings, rescuing of people at places where there is a fire, and the like.

Humanoid robots can also be used "to live together" in the same living space as human beings, that is, for entertainment purposes. In this application, the robot is characterized more as being closely related to life rather than as helping human beings in life such as performing tasks in place of them.

The theme of entertainment robots is the research and development of the motion patterns which are executed during a task rather than realizing specific industrial purposes at high speeds and with high precision. In other words, it is preferable for the entertainment robots to faithfully reproduce the mechanism which allows harmonious movement of the whole body possessed by nature by animals which walk erect using two legs, such as human beings and monkeys, and to make them realize this natural and smooth movement. In emulating a highly intelligent animal which stands erect, such as human beings and monkeys, it is to be considered that a motion pattern using the four limbs is natural for a living body, and that it is desirable that the motions are sufficiently indicative of emotions and feelings.

Further, entertainment robots are required not only to faithfully execute a previously input motion pattern, but also to express its feelings by moving in a lively manner in response to the words and actions of a person (such as speaking highly of someone, scolding someone, or hitting someone). In this sense, entertainment robots which emulate human beings are rightly called humanoid robots.

In conventional toy machines, the relationship between the operations which are carried out by the user and the response motion is fixed/standardized, so that the same motion is merely repeated, causing the user to eventually get tired of the toy machines. In contrast, entertainment robots, though they move in accordance with a motion generation time series model, can change this time series model, that is, impart a learning effect, in response to the detection of an external stimulus which is produced by, for example, the operation of the user. Therefore, the relationship between the operations which are carried out by the user and the responding motion is programmable, making it possible to provide a motion pattern which does not make the user tired of it or which conforms to the preferences of the user. In addition, by operating the robot, the user can enjoy a type of educational simulation.

A robot is made to operate to, for example, perform certain "tasks" such as parts assembly, or to "move" to, for example, transport things. Therefore, the robot is basically a means for achieving a specific result.

In entertainment robots where human beings and pets are used as models, the word "task" has a wider meaning, so that, in addition to including industrial and production activities, it also includes the execution of entertainment motion patterns such as "dancing" and "greeting someone." Further, the range of tasks using the legs extend from those including motion patterns which are executed merely for the purpose of "moving" from place to place to those which include motion patterns which involve high-speeds and are strongly characterized as entertainment motion patterns, such as running and jumping.

However, these tasks which are executed by entertainment robots are similarly confined to being carried out to achieve particular results.

Other than for purposes for achieving a certain result, human beings move for conversational purposes, such as making gestures and waving the hands. Such conversational motions make it possible for human beings to understand each other using the sense of sight. The observer of the motion pattern can intuitively understand the meaning of the motion pattern of the other person, thereby making it unnecessary to communicate through words or to interpret words. For example, even if the two people use different languages, they can understand each other's intentions using motion patterns even if they do not understand each other's language very well. In other words, communication by a motion may at times make it possible for people to smoothly understand each other.

In contrast to this, a robot is basically a mechanical device, and can communicate with external devices at high speeds and with high precision through a predetermined communications medium by following a predetermined communications protocol. The term external device used here may be another robot or a host computing machine system for generating a command to a robot or for controlling the motion of the robot. In recent years, data communications technologies by wire or by radio have improved, so that one or more communications interfaces can be installed in the robot device.

However, robots cannot be made to understand each other unless the proper communications interface or protocols are used.

Compared to other types of robots such as arm robots and crawler robots, robots which having four relatively long limbs, such as humanoid robots, have a much higher degree of freedom provided by joints. However, this high degree of freedom has not been positively made use of in realizing communication by a motion of the robot 100.

SUMMARY OF THE INVENTION

Accordingly, it is an object of the present invention to provide an excellent legged robot comprising at least limbs and a trunk, and a method of controlling the motion of the legged robot.

It is another object of the present invention to provide an excellent legged robot which can execute various motion patterns using the limbs and/or the trunk, and a method of controlling the motion of the legged robot.

It is still another object of the present invention to provide an excellent legged robot which can communicate by moving the limbs and/or the trunk, and a method of controlling the motion of the legged robot.

It is still another object of the present invention to provide an excellent legged robot which through various motion patterns using the limbs and/or the trunk can come to an understanding with the external world such as robots which have not been connected through data transmission media, and a method of controlling the motion of the legged robot.

In view of the above-described problems, according to a first aspect of the present invention, there is provided an articulated robot which comprises a plurality of joints. The articulated robot includes a movement controller for controlling the movement of each of the joints, a motion language accumulator for accumulating a motion language formed by a motion pattern of the joints, and a movement output controller for giving the motion language to be used to the movement controller as a result of taking the motion language to be used from the motion language accumulator. The motion patterns are executed to express the intentions and details of communication.

In one form of the first aspect of the present invention, the articulated robot further includes an external interface used for performing operations including an image input operation, a sound input/output operation, and a data transmission/reception operation through a communications medium, and a communication controller for controlling the communication based on input/output data through the external interface. In the articulated robot, the communication controller determines the motion language to be used in accordance with the details of the communication.

In another form of the first aspect of the present invention, the motion language is realized using a method which forms a sentence by repeating the formation of a plurality of characters with the basic mode of formation being in character units, or by using a method which realizes the communication by a motion which has a meaning or based on a time-series change in a joint angle.

In still another form of the first aspect of the present invention, a plurality of motion languages are combined to express the intentions of the robot or the details of the communication. In addition, the motion language accumulator includes a motion pattern used to direct the starting of the realization of the motion language, and/or a motion pattern used to direct the ending of the realization of the motion language. For example, the starting and the ending of the realization of the motion language can be indicated by the raising of the right hand and the left hand of the humanoid robot. By executing the motion patterns thereof in starting and ending the communication, the observer of the motion language can easily and reliably recognize the motion language.

In still another form of the first aspect of the present invention, when a plurality of motion languages are combined to express the intentions of the robot or the details of the communication, the motion language accumulator includes a motion pattern used for directing the provision of a delimiter between the motion languages. By executing such a motion pattern for a delimiter between motion languages, the observer of the motion language can recognize the motion language without becoming confused.

In still another form of the first aspect of the present invention, the articulated robot further includes a movement teaching section for directly teaching the motion pattern which is executed to realize the motion language as a result of directly holding and operating each of the joints.

In still another form of the first aspect of the present invention, the articulated robot further includes a movement teaching section for indirectly teaching the motion pattern which is executed to realize the motion language as a result of actuating each of the joints along a coordinate system of the robot.

According to a second aspect of the present invention, there is provided method of controlling the motion of an articulated robot which comprises a plurality of joints and which accumulates a motion language which is formed by a motion pattern of each of the joints used to express the intentions of the robot and the details of communication. The method comprises the steps of determining the motion language to be used, and controlling the movement of each of the joints for realizing the determined motion language.

In one form of the second aspect of the present invention, the method further comprises the steps of inputting and outputting data to the outside through a communications medium and of controlling communication based on the data input/output operation. In the method, the motion language to be used is determined in accordance with the details of the communication. In addition, the inputting and outputting of data includes inputting of an image, inputting/outputting of sound, and transmitting/receiving of data.

In still another form of the second aspect of the present invention, the method further comprises the step of executing a motion pattern used to direct the starting of the realization of the motion language and/or the step of executing the motion pattern used to direct the ending of the realization of the motion language. For example, the starting and the ending of the realization of the motion language can be indicated by the raising of the right hand and the left hand of the humanoid robot. By executing the motion patterns thereof in starting and ending the communication, the observer of the motion language can easily and reliably recognize the motion language.

In still another form of the second aspect of the present invention, the method comprises the step of, when the intentions of the robot or details of the communication are expressed by combining a plurality of the motion languages, executing a motion pattern used to direct the provision of a delimiter between the motion languages. By inserting a motion pattern for a delimiter between motion languages, the observer of the motion languages can recognize the motion pattern without becoming confused.

In still another form of the second aspect of the present invention, the method further comprises the step of directly teaching the motion pattern which is executed to realize the motion language as a result of directly holding and operating each of the joints.

In still another form of the second aspect of the present invention, the method comprises the step of indirectly teaching the motion pattern which is executed to realize the motion language as a result of actuating each of the joints along a coordinate system of the robot.

The present invention is widely applicable to an articulated robot comprising a plurality of joints. More preferably, it is applicable to a legged mobile robot such as a humanoid robot which has relatively long arms and legs and which can execute a motion pattern which is highly expressive of emotions and feelings.

A humanoid robot can realize a motion language by executing a motion pattern using the four limbs and the trunk or a time-series change in a joint angle. Here, "motion language" refers to a pseudolanguage used to express the intentions of the robot and the details of the communication to an external device or a user by using a predetermined motion pattern of the four limbs and the trunk. The motion language makes it possible to transmit information without using any digital data such as a program code and a communications code. The motion language is based on, for example, a method in which the basic formation mode is in character units, and the robot 100 repeatedly forms a plurality of characters in order to form a sentence, or a method in which communication is realized by a motion which has a meaning or based on a time-series change in a joint angle.

By using the motion language which is made up of, for example, a motion pattern which is an approximation of the contour/form of a character, it can be visually recognized and interpreted. By visually recognizing and interpreting the contour/form which is represented by the motion pattern, the meaning and character represented by each motion pattern can be determined even by a human being or a robot which does not possess the same motion language database.

For example, when the robot steps into a dangerous working area, it can give a message, such as the condition of the working area, to an observer at a remote place without using any data communications means.

Other objects, features, and advantages of the present invention will become manifest from a more detailed description with reference to an embodiment of the present invention described below and the attached drawings.

DESCRIPTION OF THE PREFERRED EMBODIMENT

Hereunder, a description of a preferred embodiment of the present invention will be given in detail with reference to the drawings.

Figure 1:
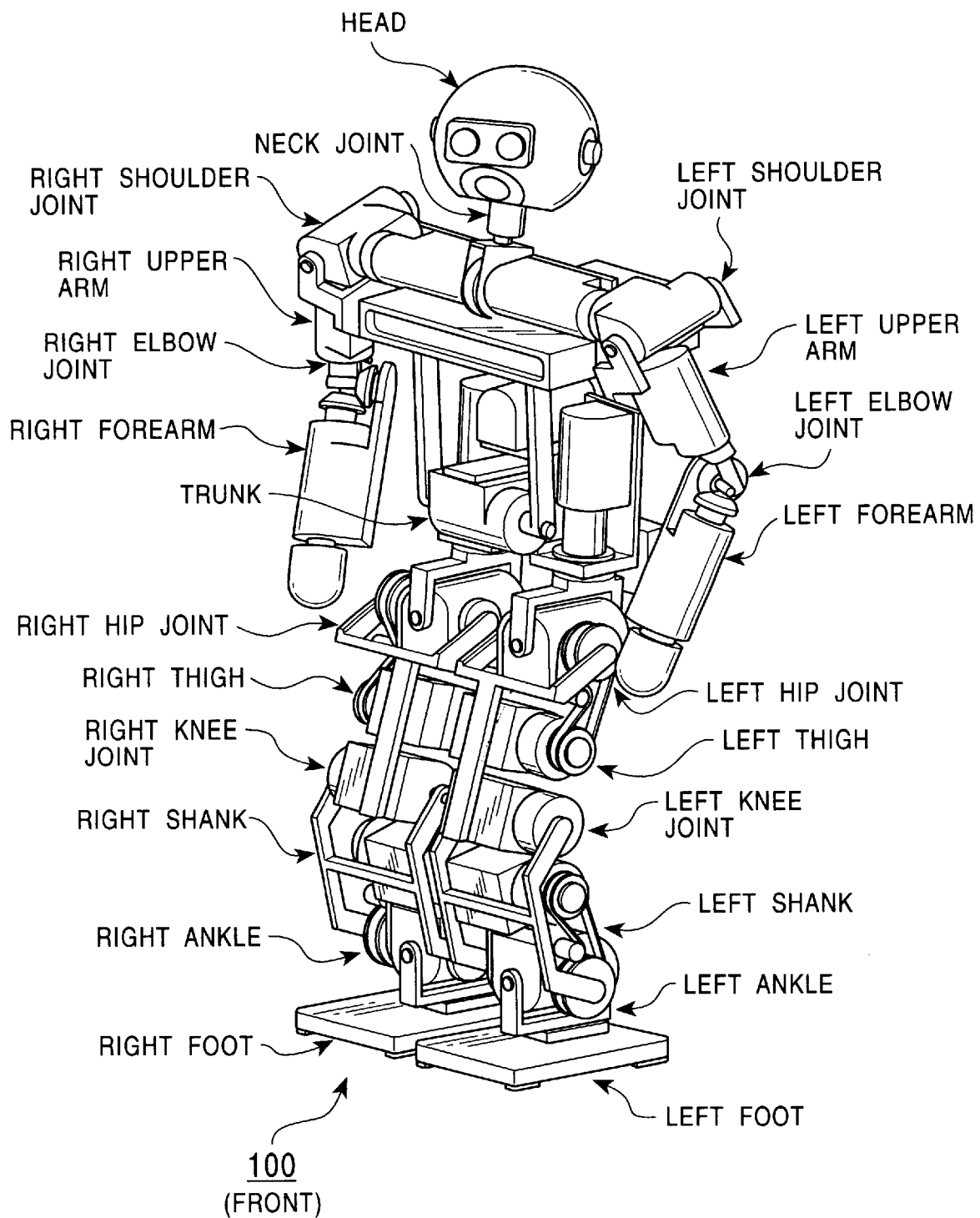
FIG. 1 is a front view of a legged mobile robot 100 of an embodiment of the present invention.
Figure 2:
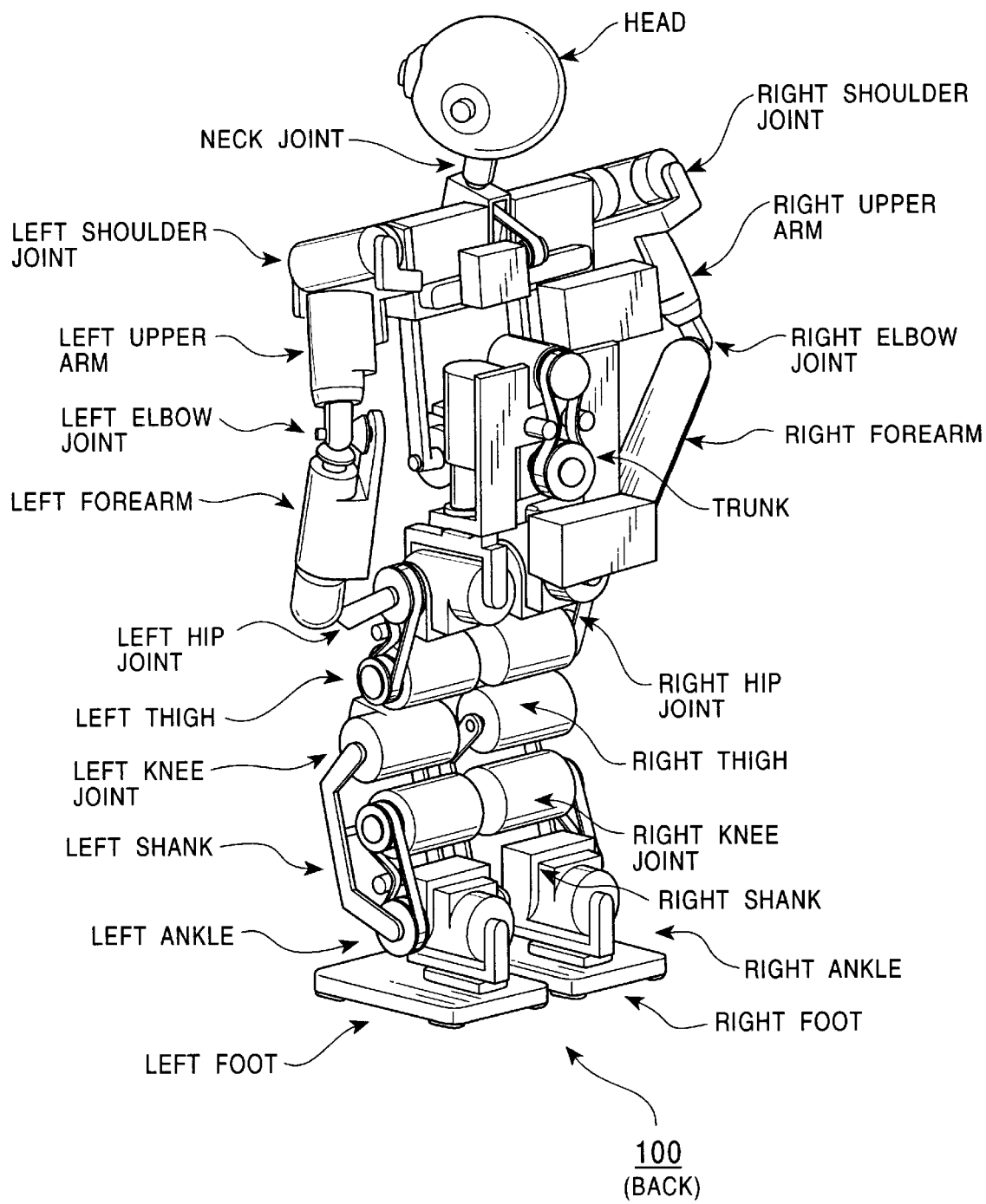
FIG. 2 is a back view of the legged mobile robot 100 of the embodiment of the present invention.

FIGS. 1 and 2 are front and back views showing a humanoid legged mobile robot 100 of an embodiment of the present invention which is in an upright posture. As shown in the figures, the legged mobile robot 100 comprises the two lower limbs or left and right legs used for movement, a trunk, left and right upper limbs, and a head.

The left and right lower limbs each comprise a thigh, a knee joint, a shank, an ankle, and a foot. They are connected to substantially the bottom end of the trunk by corresponding hip joints. The left and right upper limbs comprise corresponding upper arms, elbow joints, and forearms. They are connected to their corresponding left and right upper side edges of the trunk by corresponding shoulder joints. The head is connected to substantially the uppermost end center portion of the trunk by a neck joint.

A control system which cannot be seen in FIGS. 1 and 2 is disposed inside a trunk unit. The control system is a case in which a controller (a main control section) for controlling the actuation of each joint actuator making up the legged mobile robot 100 and for processing externally input information from, for example, each sensor (described later), and a peripheral device such as a power supply circuit are installed. The control section may also include a remote-control communications interface or a communications device.

Figure 3:
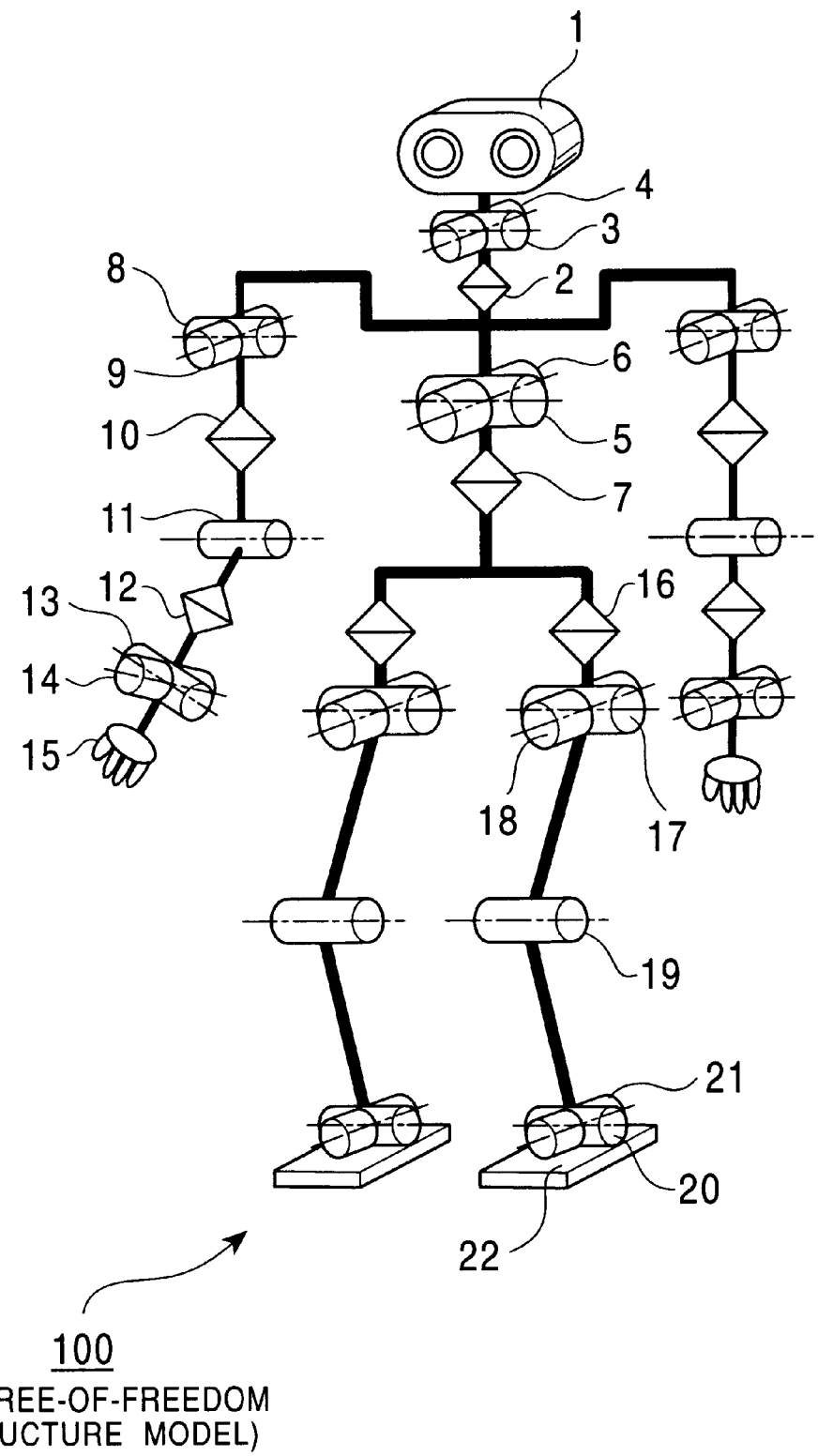
FIG. 3 is a schematic view of a degree-of-freedom structural model which the legged mobile robot 100 of the embodiment uses.

FIG. 3 schematically illustrates a joint structure of the legged mobile robot 100, which provides the degrees of freedom thereof. As shown in FIG. 3, the legged mobile robot 100 comprises an upper part of the body including two arms and a head 1, lower limbs or two legs used for movement, and a trunk which connects upper limbs and the lower limbs.

A neck joint which supports the head 1 possesses three degrees of freedom which are provided in correspondence with a neck joint yaw axis 2, a neck joint pitch axis 3, and a neck joint roll axis 4.

Each arm includes a shoulder joint pitch axis 8, a shoulder joint roll axis 9, an upper arm yaw axis 10, an elbow joint pitch axis 11, a forearm yaw axis 12, a wrist joint pitch axis 13, a wrist joint roll axis 14, and a hand 15. Each hand 15 is actually a structure which has many joints and degrees of freedom including a plurality of fingers. However, since the motion of each hand 15 itself rarely contributes to and influences the stable posture control operations and the walking controlling operations of the robot 100, each hand in the embodiment is assumed to possess zero degrees of freedom. Therefore, in the embodiment, each of the left and right arms possesses seven degrees of freedom.

The trunk possesses three degrees of freedom which are provided in correspondence with a trunk pitch axis 5, a trunk roll axis 6, and a trunk yaw axis 7.

The left and right legs comprising the lower limbs each include a hip joint yaw axis 16, a hip joint pitch axis 17, a hip joint roll axis 18, a knee joint pitch axis 19, an ankle joint pitch axis 20, a joint roll axis 21, and a foot (or a sole) 22. The points where the hip joint pitch axes 17 and their corresponding hip joint roll axes 18 intersect are defined as the locations of the hip joints of the robot 100 in the embodiment. The feet (or soles) 22 of the human body are actually structures which have many joints and degrees of freedom including the soles. However, the soles of the legged mobile robot 100 of the embodiment are assumed as having zero degrees of freedom. Therefore, in the embodiment, each of the left and right legs possesses six degrees of freedom.

To sum up, the total number of degrees of freedom of the whole legged mobile robot 100 of the embodiment is 3+7×2+3+6×2=32. However, the number of degrees of freedom of the legged mobile robot 100 is not necessarily limited to 32. It is obvious that the number of degrees of freedom, that is, the number of joints can be increased or decreased as necessary in accordance with, for example, the specification requirements and the limiting conditions in designing and manufacturing the robot.

Each degree of freedom of the above-described legged mobile robot 100 provided by each joint is actually provided by the active operation of its corresponding actuator. To respond to various demands such as of approximating the form of the robot to the natural form of a human being by removing extra bulges from the external appearance of the device, and of controlling the posture of an unstable structure which walks using two legs, it is preferable to use small and light joint actuators. In the embodiment, there are used in the robot 100 small AC servo actuators which are directly connected to gears and which incorporate in a motor unit a servo control system formed into a one-chip system. A small AC servo actuator which is applicable to a legged robot is disclosed in, for example, Japanese Patent Application No. 11-33386 which has already been assigned to the applicant.

Figure 4:
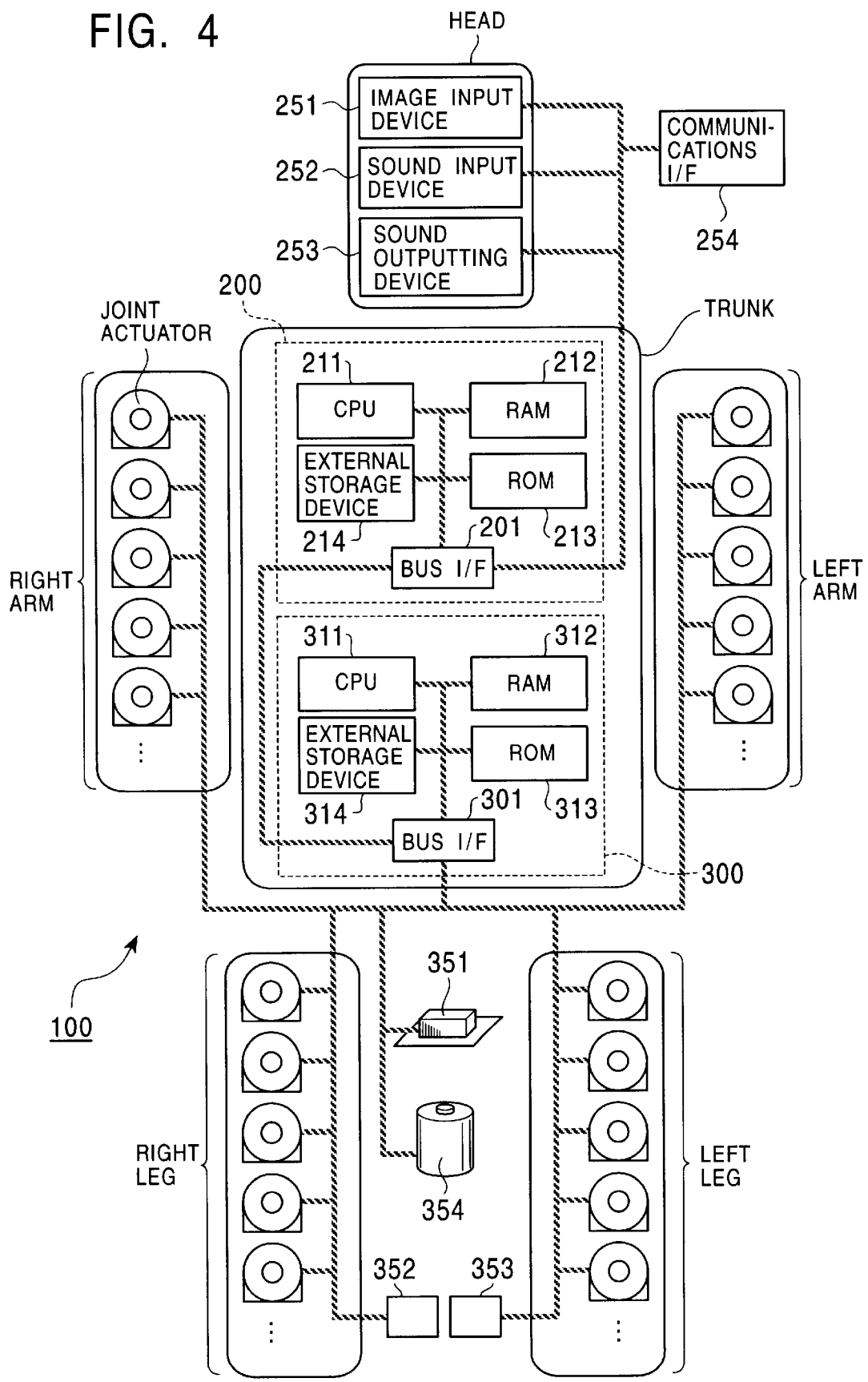
FIG. 4 is a schematic view of the structure of a system for controlling the legged mobile robot 100 of the embodiment.

FIG. 4 is a schematic view of the structure of a controlling system of the legged mobile robot 100 of the embodiment of the present invention. In the figure, the system comprises a thinking controlling module 200 which directs the expression and determination of emotions and feelings by dynamically reacting to, for example, the input operation performed by the user, and a movement controlling module 300 for controlling the harmonious movement of the whole body of the robot by, for example, actuating a joint actuator.

The thinking controlling module 200 is an independent information processing device which can perform a self-completing operation and which comprises a CPU (central processing unit) 211 for executing a computing operation regarding the expression and determination of feelings and emotions, RAM (random access memory) 212, ROM (read only memory) 213, and an external storage device (such as a hard disk drive) 214. Motion language database (described later) for realizing communication by a motion can be accumulated in the external storage device 214.

Through a bus interface 201, various devices such as a communications interface 254 which exchanges data with systems outside the robot 100 are connected to the thinking controlling module 200. The communications interface 254 performs the exchange of data through, for example, an image input device 251 such as a CCD (charge coupled device) camera, a sound input device 252 such as a microphone, a sound outputting device 253 such as a speaker, and LAN (local area network) which is not shown.

At the thinking controlling module 200, the present feelings and intentions of the legged mobile robot 100 are determined in accordance with, for example, external stimulus, such as the input of visual data from the image input device 251 or the input of hearing data from the sound input device 252. In addition, a command is issued to the movement controlling module 300 so that the robot acts, that is, moves using the four limbs, based on the decision made.

On the other hand, the movement controlling module 300 is a separate information processor for performing a self-completing operation. It comprises a CPU (central processing unit) 311 for controlling the harmonious movement of the whole body of the robot 100, RAM (random access memory) 312, ROM (read only memory) 313, and an external storage device (such as a hard disk drive) 314. For example, time-series changes in a joint angle or motion patterns used for realizing the motion language using the four limbs can be accumulated in the external storage device 314. The motion language is a pseudolanguage used to express the intentions of the robot and the details of the communication to an external device or a user by using a predetermined motion pattern of the four limbs and the trunk. Specific examples of the various motion languages will be given later.

Through a bus interface 301, the movement controlling module 300 has connected thereto various devices such as joint actuators for providing degrees of freedom at the joints (see FIG. 3) which are spread throughout the whole body of the robot 100, a posture sensor 351 for measuring the posture and inclination of the trunk, floor contact confirmation sensors 352 and 353 for detecting the contacting of and moving off of the soles of the left foot and right foot with and from the floor, and a power supply controller for controlling the power supply such as a battery.

At the movement controlling module 300, the harmonious movement of the whole body by each of the joint actuators is controlled while realizing the action prescribed by the thinking controlling module 200. In other words, the CPU 311 takes out a motion pattern in accordance with the action prescribed by the thinking controlling module 200 from the external storage device 314 or internally generates a motion pattern. In accordance with the specified motion pattern, the CPU 311 sets, for example, the movement of the feet, the path of the ZMP (zero moment point), the movement of the trunk, the movement of the upper limbs, the horizontal position and height of the waist, etc., and sends to each of the joint actuators a command value for instructing the execution of the pattern in accordance with the details of these settings. (ZMP in the specification is the point on the floor surface where the moment resulting from the floor reaction force when the robot walks is zero. The ZMP path refers to the path of movement of the ZMP when, for example, the robot 100 is walking.) By detecting the tilting and posture of the trunk of the robot 100 by the output signal of the posture sensor 351 and by detecting whether each movable leg is either in a "swinging state" or a "standing state" by an output signal of each of the floor contact confirmation sensors 352 and 353, the CPU 311 can appropriately control the harmonious movement of the whole body of the legged mobile robot 100.

The movement controlling module 300 returns to the thinking controlling module 200 information concerning to what degree the robot has acted in accordance with the decision made at the thinking controlling module 200, that is, in accordance with the information concerning the processing state.

The thinking controlling module 200 and the movement controlling module 300 are constructed on a common platform, and are connected together through the bus interfaces 201 and 301.

In the case where, as shown in FIG. 3, the legged mobile robot 100 has a bending portion (that is, the trunk pitch axis 5 and/or the trunk roll axis 6) at the trunk thereof, when the thinking controlling module 200 is disposed above the bending portion, and the movement controlling module 300 is disposed below the bending portion, a wiring which passes by the bending portion only serves as a bus for linking both of these modules. Therefore, the number of wires is decreased, thereby simplifying the electrical component/wiring design near the bending portion.

As can be seen from FIG. 4, the thinking controlling module 200 comprises many wires which are used to make connections with various devices which are disposed in the head of the robot 100, such as an image input device 251 and a sound input device 252 which correspond to the sense of sight and the sense of hearing of a human being, respectively, and a sound outputting device 253. Since the main movement system of the legged mobile robot 100 is the movable legs, the movement controlling module 300 includes a very large number of wires which extend towards the lower half of the body of the robot 100. Therefore, by disposing the thinking controlling module 200 above the trunk, and the movement controlling module 300 below the trunk, the total lengths of the wires of the entire system can be decreased, thereby making it possible to simplify the wiring structure.

Figure 5:
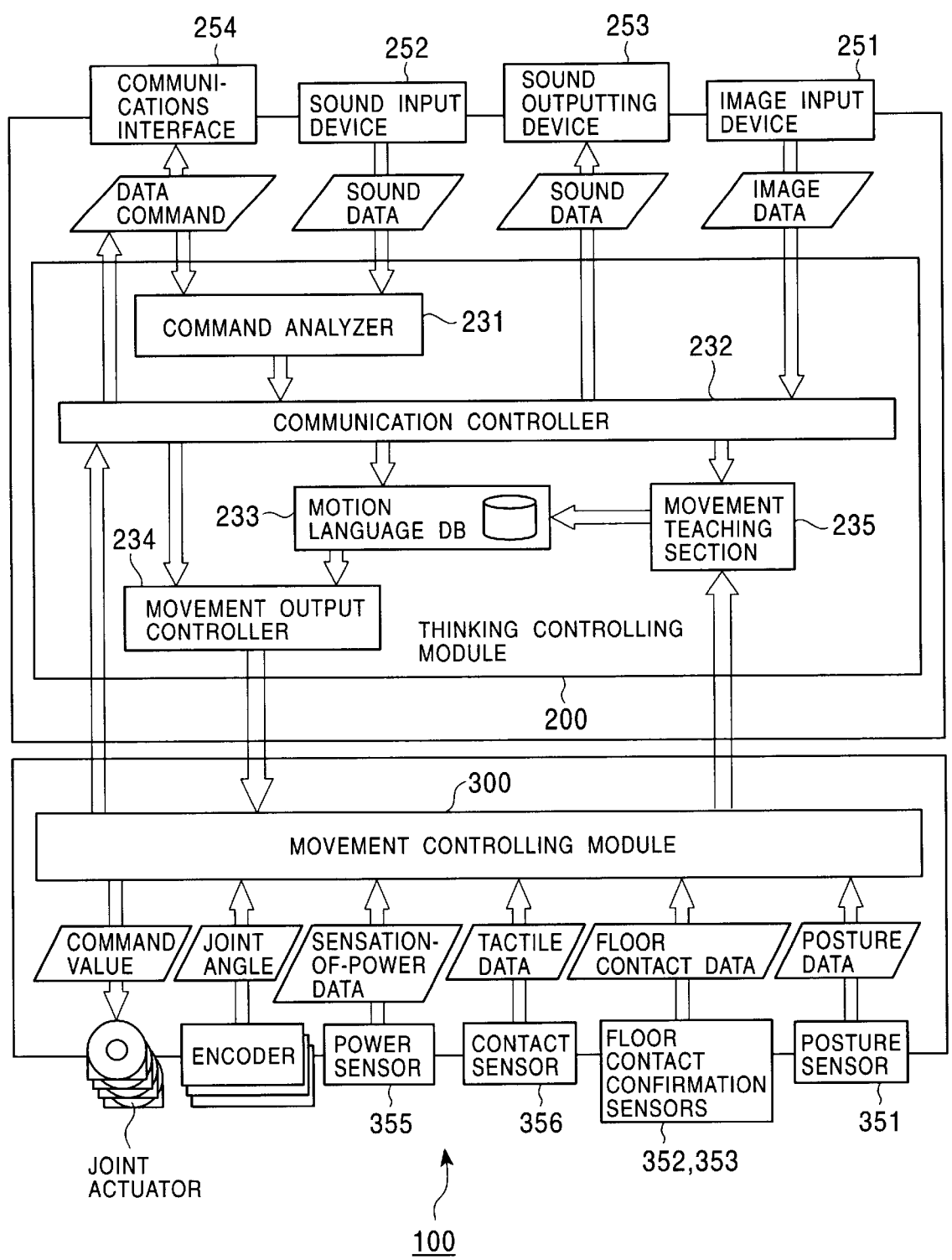
FIG. 5 is a schematic view of the flow of control data between a thinking controlling module 200 and a movement controlling module 300 inside the legged mobile robot 100 of the embodiment.

FIG. 5 schematically illustrates the flow of control data between the thinking controlling module 200 and the movement controlling module 300 inside the legged mobile robot 100.

At the movement controlling module 300, the harmonious movement of the whole body is controlled by actuating each of the joint actuators in synchronism with each other while realizing the action prescribed by the thinking controlling module 200 through a movement output controller 234. More specifically, in accordance with the specified motion pattern, the movement of the legs, the ZMP (zero moment point) path, the movement of the trunk, the movement of the upper limbs, the horizontal position and height of the waist, etc., are set, and a command value used to instruct the execution of a motion in accordance with the details of the settings is sent to each of the joint actuators.

From an encoder which is provided at each joint actuator, the rotational angle data of each joint is returned. As a result, the movement controlling module 300 can know the actual displacement amount and displacement speed of each joint. In addition, by subjecting geometrical data concerning, for example, each joint displacement angle and each arm length to a predetermined geometrical computation, the pattern of the actual movement of the whole body of the legged mobile robot 100 can be obtained. The encoder output of each joint actuator is sent towards the thinking controlling module 200 in order to teach the movement.

Detection signals from the posture sensor 351 and the floor contact confirmation sensors 352 and 353 for detecting the contacting of the left and right soles with the floor are input to the movement controlling module 300. Based on these detection signals and the actual motion pattern which has been calculated, the harmonious movement of the whole body of the legged mobile robot 100 can be appropriately controlled.

Although not shown in FIG. 4, a power sensor, a contact sensor, a temperature sensor, etc., may be further disposed at predetermined portions of the legged mobile robot 100. The movement controlling module 300 can use sensation-of-power data, tactile data, and temperature data taken in from these sensors in order to appropriately perform a controlling operation.

Based on external stimulus such as sound or something affecting the sense of vision (for example, stimulus obtained from a nearby user), the thinking controlling module 200 can determine the present feelings and intentions of the legged mobile robot 100. In other words, the thinking controlling module 200 takes in image data as visual data which is acquired at the image input device 251, and sound data as hearing data which is input to the sound input device 252. In accordance with such external stimuli, the present feelings and intentions of the legged mobile robot 100 are determined.

The thinking controlling module 200 can also determine the present feelings and intentions of the legged mobile robot 100 in accordance with data or a command transmitted from an external system through the communications interface 254, without depending upon external stimuli which are directly input to the legged mobile robot 100. In this case, a user at a remote place can supply data regarding, for example, the five senses of the robot 100 or transmit a command to make it possible to prompt the robot 100 to make a decision.

Further, the thinking controlling module 200 issues a command to the movement controlling module 300 so that the action or conduct, that is, movement using the four limbs based on the decision made is executed.

Still further, the thinking controlling module 200 not only prompts a movement controlling operation in accordance with the decision made by the module 200 itself, but also can cause sound data which expresses the intentions and the feelings of the robot to be output from the sound outputting device 253.

Still further, the thinking controlling module 200 has the ability to communicate by a motion, and, thus, can direct the movement controlling module 300 to execute a language realization motion pattern. In order to realize communication by a motion, the thinking controlling module 200 comprises a command analyzer 231, a communication controller 232, a motion language database 233, a movement output controller 234, and a movement teaching section 235.

The command analyzer 231 interprets a command input in an electronic data format through the communications interface 254, or a command input as a sound command through the sound input device 252. The command analyzer 231 can 51 also interpret a command written in a visual information format such as a cyber code as a result of inputting the command to the image input device 251.

When, as a result of interpreting the command, the command analyzer 231 determines that the command is a motion command in which a particular result is directly expected, it gives the result of the interpretation to the movement output controller 234. In contrast, when the command analyzer 231 determines that the command is a command used for communication by a motion (a motion language command) instead of a command in which a particular result is directly desired, it gives the result of the interpretation to the communication controller 232.

When sound is used for communication, the communication controller 232 outputs the details of the communication using sounds through the sound outputting device 253. On the other hand, when communication is carried out using a language which is realized based on a motion pattern, the communication controller 232 searches the motion language database 233 in order to take out the appropriate motion pattern or a time-series change in a joint angle, that is, a motion language, and gives this to the movement output controller 234.

The communication controller 232 may control bi-directional communication between the robot 100 and an external device or a user. In this case, it is preferable not only to include a mechanism for determining the motion command issued to the movement controlling module 300, but also to include, for example, a mechanism for managing the history of the motion commands which have been issued in the past, and a mechanism for studying the determination of the motion commands based on these command histories.

The movement output controller 234 transmits the motion command or motion language determined at the thinking controlling module 200 to the movement controlling module 300 at a predetermined suitable timing.

The motion language which accumulates in the motion language database 233 is a pseudolanguage which is realized by a motion pattern using the four limbs of the legged mobile robot 100 or based on a time-series change in a joint angle. The motion language allows information to be transmitted without using program codes, communication codes, or any other such types of digital data. The details of the motion language are discussed later.

Such motion language database can be accumulated in, for example, an external storage device 214 (or a ROM 213) in a nonvolatile manner. At the time of shipment, the motion language database can be preloaded in the external storage device 214. After shipment, the motion language database can be installed in the external storage device 214 through a portable recording medium such as a CD (compact disc), an MO (magneto-optical disc), and a DVD (digital versatile disc). In addition, a motion language database can be downloaded from a server (not shown) of a network through the communications interface 254.

Further, the motion language can be taught to the actual machine, that is, the legged mobile robot 100. One example of a teaching method which may be used involves the user (operator) directly holding and manually operating each of the joints of, for example, the hands and feet of the robot 100 in order to directly teach the motion pattern used for realizing the motion language. Another example of a teaching method which may also be used involves the actualization of each of the joints of, for example, the hands and feet of the robot 100 in accordance with the orthogonal coordinate system through a user input device, such as a commander, in order to indirectly teach the motion pattern used to realize the motion language.

Figure 6:
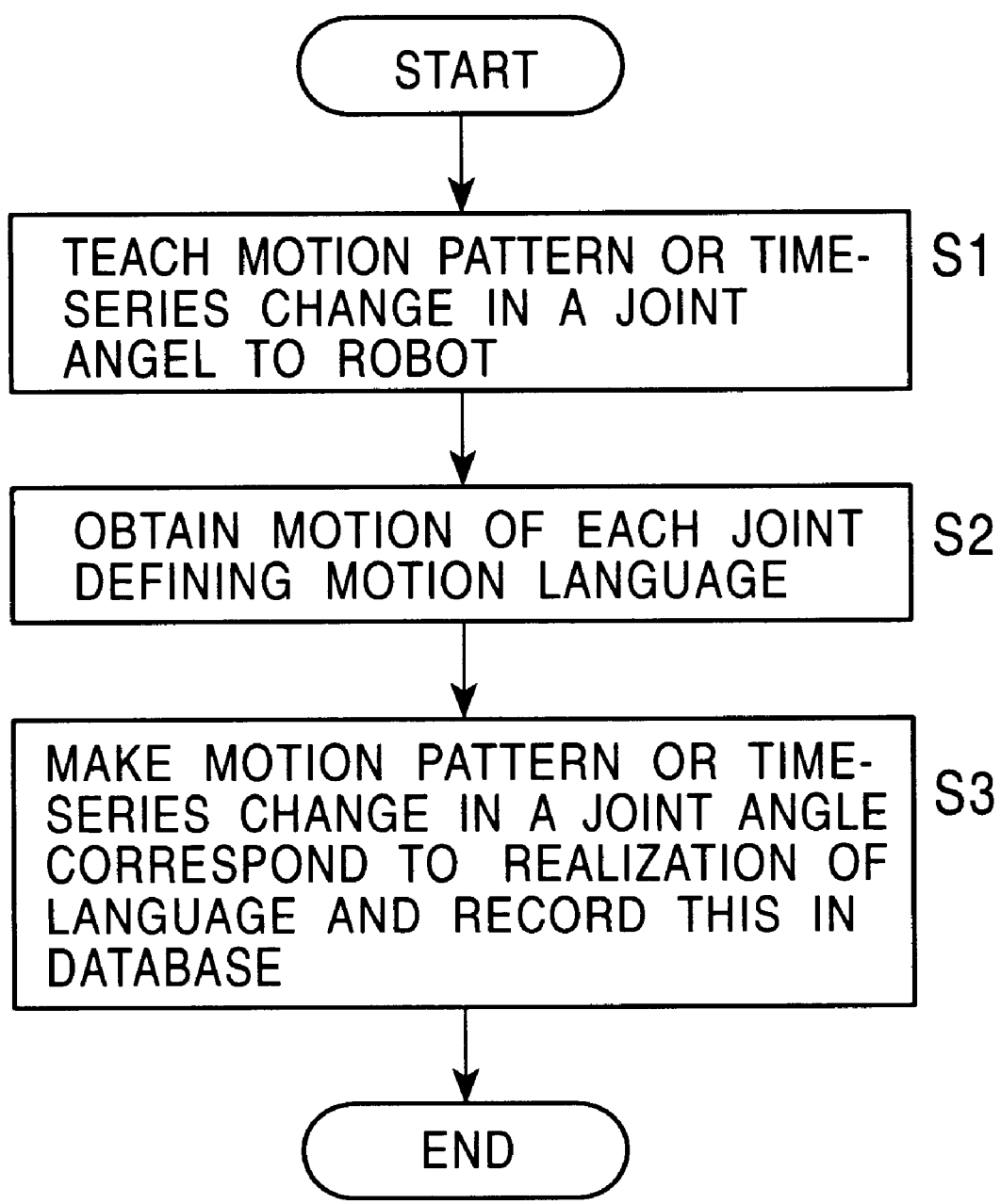
FIG. 6 shows a flowchart illustrating the procedures for teaching a motion language to the legged mobile robot 100.

FIG. 6 illustrates in flowchart form the procedures for teaching the motion language to the legged mobile robot 100. Using any teaching method, such as a teaching playback method or an online method, the operator or user of the robot 100 can input the motion language with respect to the four limbs of the legged mobile robot 100 (Step Si). During the inputting operation, an angle of rotation which defines the motion pattern or the time-series change in a joint angle is output from the encoder of each joint actuator (Step S2). The operator provides a meaning to the realization of the language through the movement teaching section 235 with respect to the taught motion pattern or the time-series change in a joint angle. As a result of this, the rotational angle data which defines the motion pattern or the time-series change in a joint angle is made to correspond to the realization of the language, and is recorded in the database as a motion language (Step S3).

Motion language in the present invention refers to a pseudolanguage for expressing to, for example, an external device or a user the intentions or the details of the communication using a predetermined motion pattern using the four limbs and the trunk. The motion language makes it possible to transmit information without using any digital data such as a program code and a communications code. The motion language in the embodiment is based on, for example, a method in which the basic realization mode is in character units, and the robot 100 repeatedly forms a plurality of characters in order to form a sentence, or a method in which communication is realized by a motion which has a meaning or based on a time-series change in a joint angle.

In the former case where the motion language is based on a method in which the basic realization mode is in character units, characters are combined in order to make it possible to form an unlimited number of words and sentences. In other words, the motion language makes it possible to achieve an infinite number of types of communication. However, in order to make the robot 100 communicate once, it is necessary to execute a motion pattern for every character of a sentence which expresses the details of the communication, so that it takes a relatively long time to realize the motion language.

Figure 7:
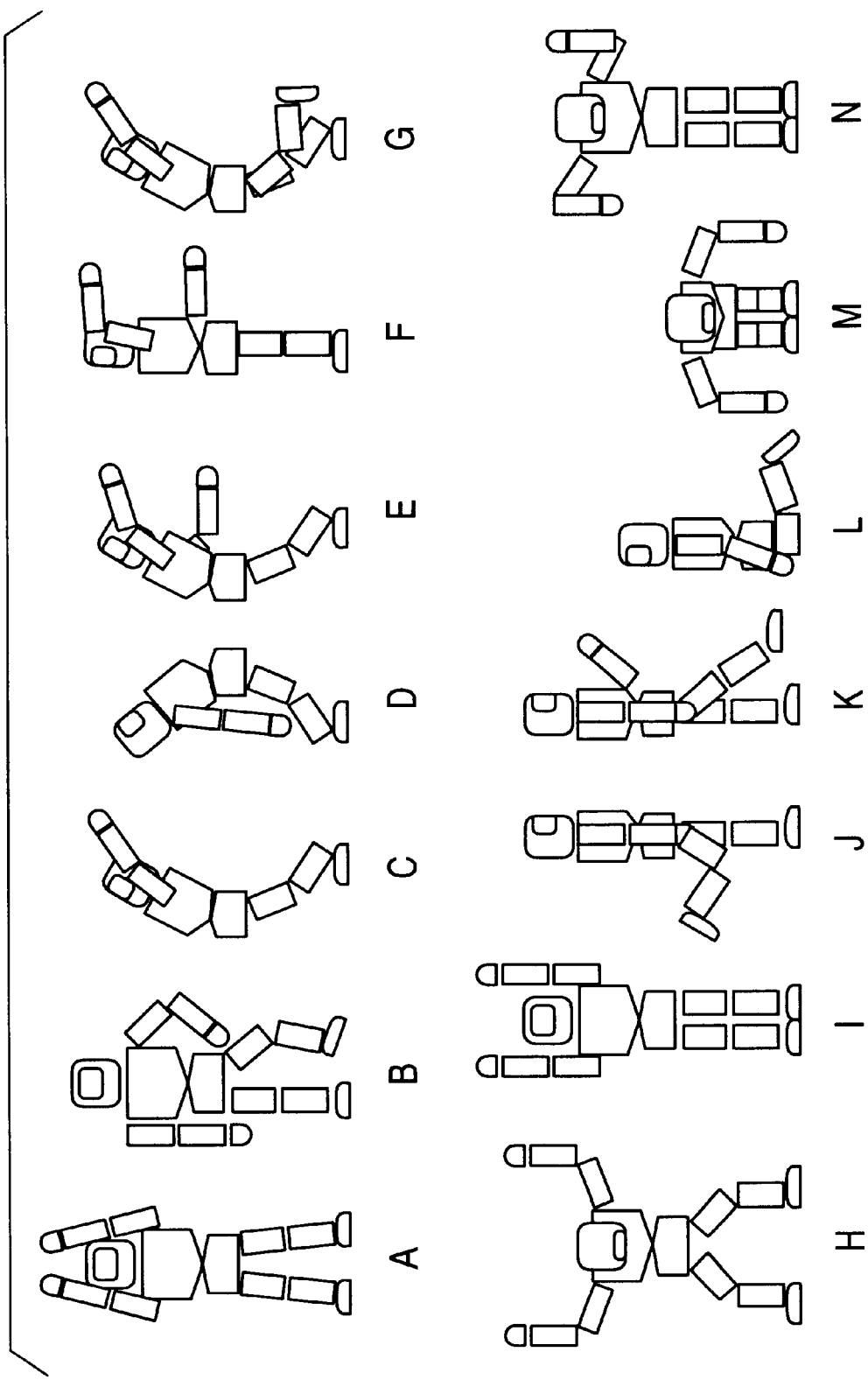
FIG. 7 illustrates the motion patterns of the legged mobile robot 100 for forming letters (from A to N) of the alphabet, in a method used to realize a motion language one character at a time.
Figure 8:
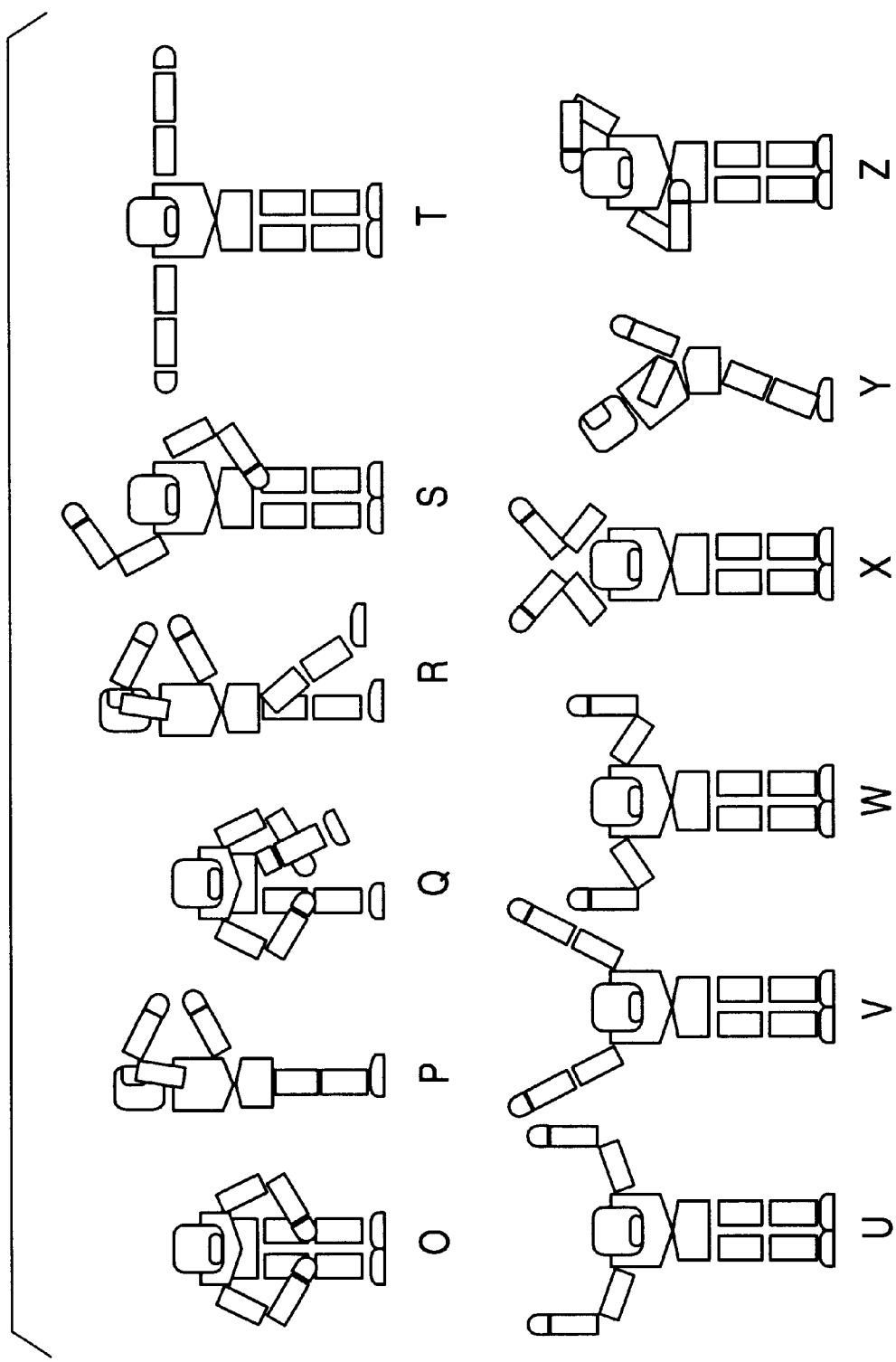
FIG. 8 illustrates the motion patterns of the legged mobile robot 100 for forming letters (from O to Z) of the alphabet, in the method used to realize a motion language one character at a time.

FIGS. 7 and 8 illustrate examples of motion patterns of the legged mobile robot 100 for forming the letters of the alphabet using the method in which the basic realization mode of the motion language is in character units. It is to be understood that, by successively executing the motion pattern which corresponds to each letter of the alphabet, any type of words and sentences can be formed by the robot 100.

In the examples shown in FIGS. 7 and 8, each of the letters is formed by causing the legged mobile robot 100 to form each motion pattern which is an approximation of the shape/contour of each letter, using the four limbs and the trunk. Therefore, even if robots which do not have the same motion language databases are used, or even if it is a human being who cannot possess a motion language database in the first place, the characters which are indicated by the corresponding motion patterns can be determined by visually recognizing and interpreting the contours/shapes which the corresponding motion patterns indicate. For example, a robot which has stepped into a dangerous working area can visually convey in character units to a human being which observes or watches from a remote place a message regarding, for example, the condition of the working place without using any data communications means such as wired or radio data communication means (or without establishing any communications connection).

However, in the present invention, the motion patterns used to form the letters are not limited to those illustrated above. The letters of the alphabet can be formed using motion patterns other than those illustrated in FIGS. 7 and 8. Although the motion patterns used to form the letters of the alphabet are only illustrated, it is to be sufficiently understood that the motion patterns of the characters of language systems other than the letters of the alphabet, such as arabic numerals, Hiragana characters, Katakana characters, Kanji characters, and Hankul characters can also be formed in order to realize motion languages by causing the legged mobile robot 100 to realize the motion patterns which are approximations of the contours/shapes of the characters (or simplified forms of the characters), using the four limbs and the trunk.

In the latter case where the motion language is based on a method in which communication is realized by a motion which has a meaning or based on a time-series change in a joint angle, it is not necessary to form motion patterns which are imitations of the forms and contours of characters one character at a time, so that the motion language can be realized in a relatively short time. However, the number of types of communication that can be realized is limited to the number of types of communication previously provided in the motion language database 233.

Actually, a hybrid method which is a combination of the method used to realize the motion language one character at a time and the method used to realize communication by a motion which has a meaning or based on a time-series change in a joint angle can be used in order to realize the motion language in a relatively short time and to realize many motion languages which are not provided in the motion language database 233. In other words, the hybrid method allows a motion language to be realized highly efficiently for more general purposes.

Figure 9:
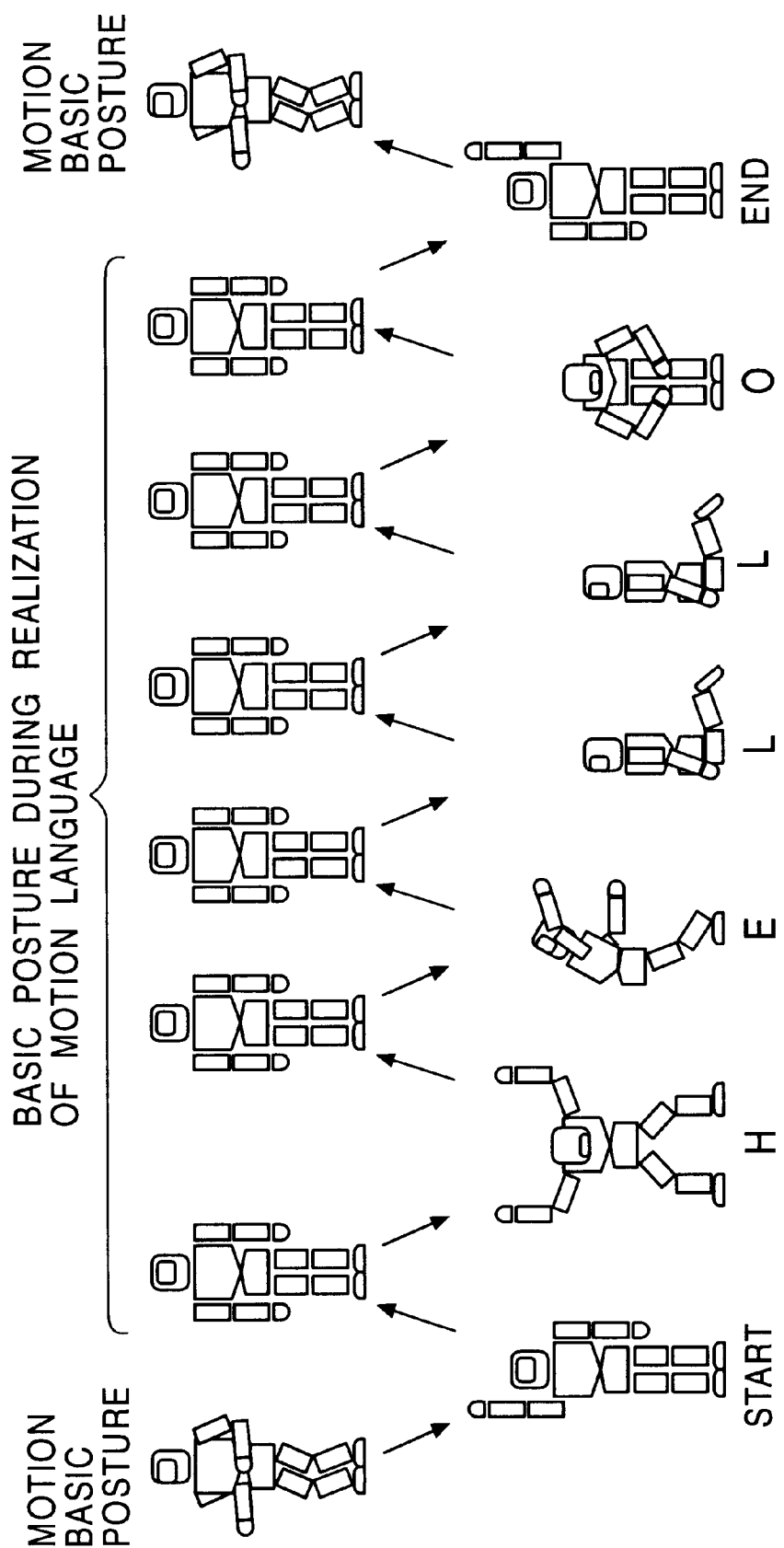
FIG. 9 illustrates an example of transforming the English word "HELLO" to a motion language in accordance with the method used to realize a motion language one character at a time.

FIG. 9 illustrates an example of transforming an English word "HELLO" into a motion language in accordance with the method of realizing the motion language one character at a time.

When the legged mobile robot 100 is executing any work or movement, the communication controller 232 starts executing the operation for realizing a motion language in response to the determination of forming the English word "HELLO."

First, the motion pattern of raising the right hand is executed in order to indicate the start of the realization of the motion language to an external device or the like.

Then, after the robot 100 has assumed a vertical posture which signifies a delimiter between characters the first letter "H" is formed as a result of a motion. The rotational position of each joint actuator which defines the motion pattern corresponding to that of the letter "H" and the time-series change in a joint angle for proceeding from the vertical posture to this motion pattern are accumulated in the motion language database 233. They are transmitted to the movement controlling module 300 through the movement output controller 234.

Thereafter, the robot 100 successively forms as a result of motions the letters "E", "L", "L", and "O", with the robot 100 assuming a vertical posture which signifies a delimiter between letters.

The rotational position of each joint actuator which defines the motion pattern which corresponds to that of each of the letters "E", "L", and "E" and the time-series change in a joint angle for proceeding from the vertical posture to the corresponding motion pattern are accumulated in the motion language database 233. They are successively transmitted to the movement controlling module 300 through the movement output controller 234.

Lastly, the motion pattern of raising the left arm is executed in order to indicate to an external device or the like that the operations for realizing the motion language are completed.

Although in the example of FIG. 9 the robot 100 is made to assume a vertical posture which signifies a delimiter between letters, whether or not to insert a delimiter between letters is optional. However, when the robot 100 is made to assume a delimiter posture, the observer of the motion language can clearly visually recognize the delimiter between characters. When the same letter, such as the letter "L" in FIG. 9, appears successively two or more times in a row, the insertion of a delimiter makes it possible to avoid confusion. It is necessary to specially determine the required time for forming a character by the observer and the side which realizes the motion language. By using the motion pattern of proceeding from the vertical posture to the posture which forms a character, and the motion pattern of proceeding from the posture which forms the character to the vertical posture, any combination of characters can be formed, thereby making it possible to decrease the total number of pieces of motion pattern data which are used.

It is not always necessary to express the delimiter between characters (or motion languages) by a vertical posture, so that other postures and motion patterns may be used to express the delimiter.

Figure 10:
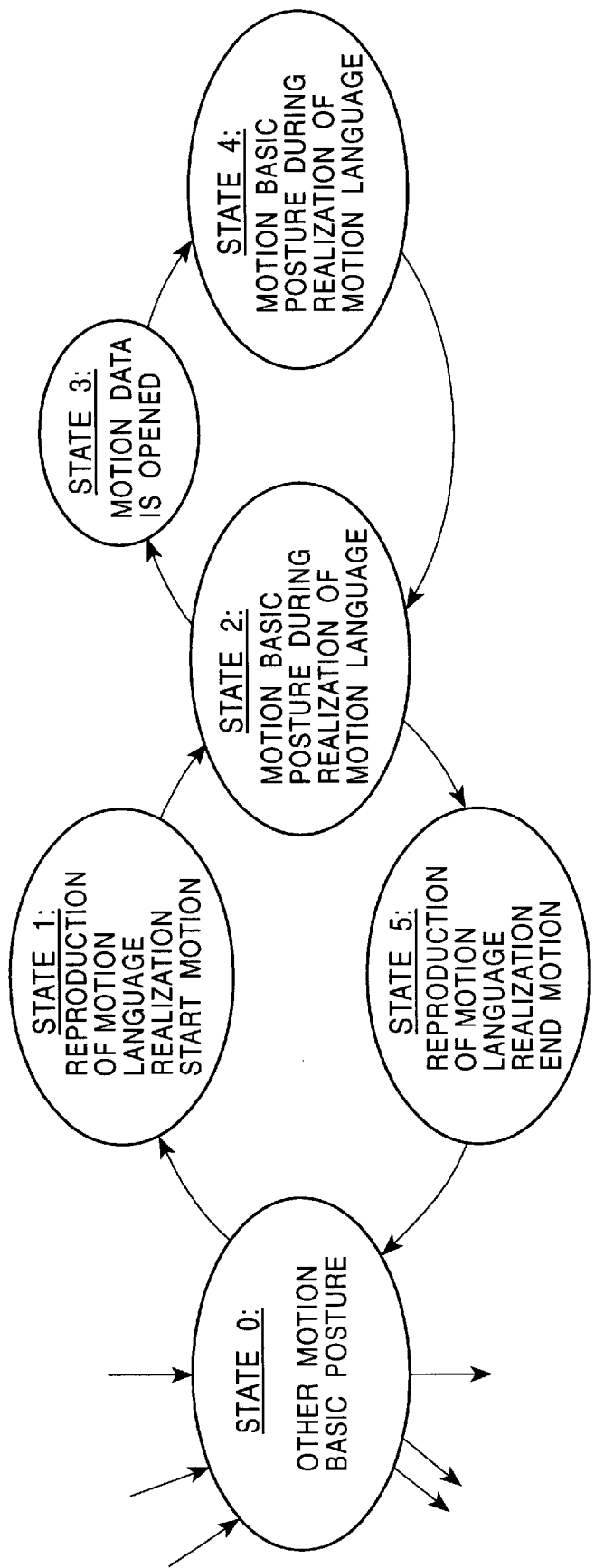
FIG. 10 illustrates in the form of transitions from one state to another the procedures for forming the English word "HELLO" which is formed in accordance with the method used to realize a motion language one character at a time.

FIG. 10 illustrates in the form of transitions from one state to another the procedures for forming the English word "HELLO" which is formed in accordance with the method of realizing the motion language one character at a time.

In State 0 in which another motion basic posture is assumed, the command analyzer 231 analyzes an external command, and issues a command for forming the English word "HELLO" using a motion language which is realized one character at a time to the communication controller 232. Each letter of the English word is buffered.

When a motion realization command is issued, the robot temporarily stops the task now being executed. The state changes to State 1 in order to reproduce a motion language realization start motion. In the example shown in FIG. 9, the motion language realization start motion corresponds to the raising of the right hand. By reading out the proper motion data from the motion language database 233, and transmitting this to the movement controlling module 300, the motion language realization start motion is reproduced.

When the reproduction of the motion language realization start motion is completed, the state changes to State 2 in order to realize a movement basic posture during the realization of the motion language. The movement basic posture corresponds to the vertical posture in the example shown in FIG. 9, and is a delimiter between letters (or motion languages).

At this time, a confirmation is made as to whether the content of the buffer which has received a formation command corresponds to that of the word "HELLO." Then, the first letter "H" is taken out therefrom in order for the state to change to State 3.

In State 3, the motion data which corresponds to that of the letter "H" is read out from the motion language database 233, and is transmitted to the movement controlling module 300. Then, the state changes to State 4 in order to reproduce this motion language realization motion.

When the reproduction of this motion language realization motion is completed, the state is restored to State 2. By executing the movement basic posture during the realization of the motion language, the delimiter between characters (or motion languages) is expressed. Thereafter, a confirmation is made as to whether the content of the buffer which stores the formation command corresponds to the word "HELLO" in order to take out the next letter, after which the state changes to State 3 in order to reproduce the next motion language realization motion.

The reproduction of the motion language realization motion is repeated until all of the letters (or the motion language) in the buffer which stores the formation commands have been formed. Therefore, in the example shown in FIG. 9, the letters "H", "E", "L", "L", and "O" are successively formed in that order.

When all of the letters (or the motion language) have been read out from the buffer which stores the formation commands, and the reproduction of the motion language realization motions of these letters have been completed, the state changes to State 5 via the movement basic posture (that is, the vertical posture) in State 2.

In State 5, a motion language realization end motion which indicates the end of the realization of the motion language is reproduced. In the example shown in FIG. 9, the motion language realization end motion corresponds to the raising of the left hand. By reading out the proper motion data from the motion language database 233, and transmitting it to the movement controlling module 300, the motion language realization end motion is reproduced.

Then, the state is restored to State 0 in order to reproduce the movement basic posture just before the issuance of the motion language realization command. In other words, the robot can restart the execution of the task which was temporarily stopped.

Figure 11:
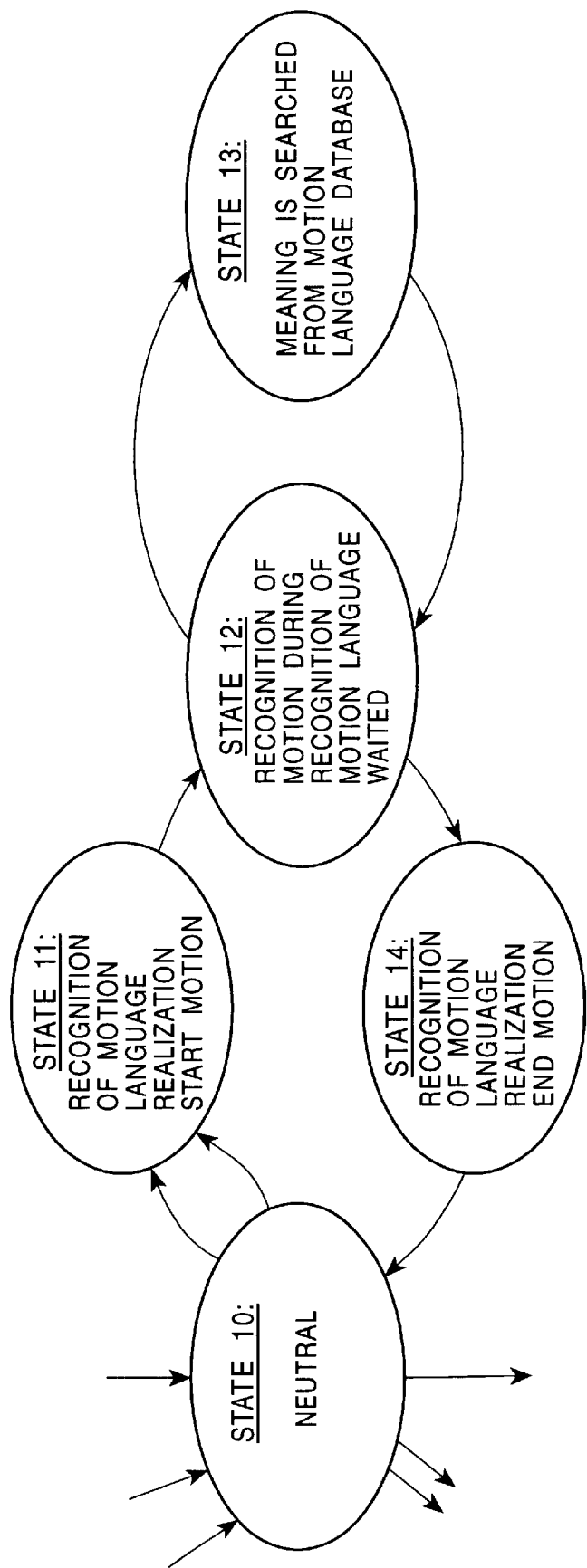
FIG. 11 illustrates in the form of transitions from state to another the procedures for recognizing the English word "HELLO" which is formed in accordance with the method used to realize a motion language one character at a time.

For example, an external device (such as another robot) having a similar motion language database can visually recognize the motion language illustrated in FIG. 9. FIG. 11 illustrates in the form of transitions from one state to another the procedures for recognizing the English word "HELLO" which is formed in accordance with the method used to realize the motion language one character at a time.

In State 10 prior to the recognition of the motion language, the movement of the legged mobile robot 100 which realizes the motion language is visually observed using, for example, a camera. When the motion is recognized, the state changes to State 11 in order to recognize the motion language realization start motion. When the start motion (which corresponds to the raising of the right hand in the example shown in FIG. 9) stored in the motion language database 233, and an image input through the camera are compared and do not match, the state returns to State 10 to execute a waiting operation.

On the other hand, when the motion language realization start motion and the image are compared and match, the state changes to State 12 in response to the completion of the reproduction of the motion language realization start motion. In State 12, when a motion other than the motion during the recognition of the motion language is recognized, and this motion differs from the motion language end motion (which corresponds to the raising of the left hand in the example shown in FIG. 9), the state changes to State 13.

In State 13, the motion language database is searched in order to determine the motion language (in this case, one character) which corresponds to that of the recognized motion.

The recognized character is temporarily stored. The state returns to State 12 in order to re-execute the operation for determining the motion language after waiting for the motion recognition operation. The motion recognition operation and the operation for determining the motion language are repeated until the robot which realizes the motion language reproduces the motion language realization end motion.

Therefore, in the example illustrated in FIG. 9, the letters "H", "E", "L", "L", and "O" are successively determined in that order. Newly determined characters are successively added to the end of the character string. As a result, the character string making up the communication message, that is, the word "HELLO" is obtained.

In State 12, when a motion other than the motion during the recognition of the motion language is recognized, and a determination is made that the motion corresponds to the motion language end motion (which corresponds to the raising of the left hand in the example shown in FIG. 9), the state changes to State 14 in order to set the recorded character string (that is, the word "HELLO" in the example shown in FIG. 9) as a return value, after which the state is restored to State 10.

When the side which recognizes the motion language is of the same type as the legged mobile robot 100, the communication controller 232 may make a decision in response to the obtainment of a term which has a meaning as a return value. In accordance with the decision made, the movement controlling module 300 may be directed to execute the motion pattern (in this case, greeting someone, etc.) in response to a sound output or an input communication.

Figure 12:
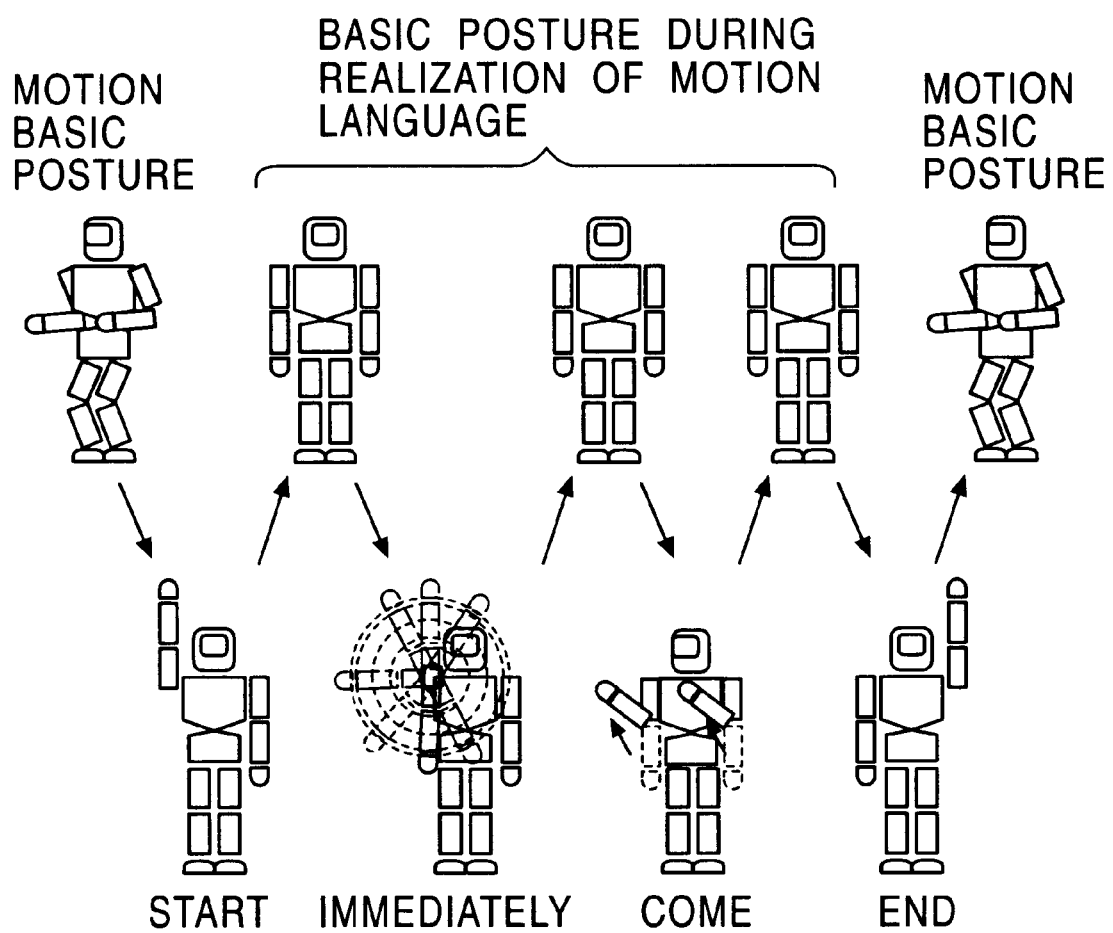
FIG. 12 illustrate s an example of transforming a communication message "Come immediately" to motion languages in accordance with a method used to realize communication by a motion which has a meaning or a time-series change in a joint angle.

FIG. 12 illustrates an example in which the communication message "Come immediately" is transformed into a motion language in accordance with the method used to realize communication by motions which have meanings or based on time-series changes in actuator angles. In the embodiment, the communication message "Come immediately" is expressed as a combination of two types of motion languages, one of which means "come" and the other of which means "immediately".

First, the motion pattern of raising the right hand is executed in order to indicate the start of the realization of the motion languages.

Next, after the robot 100 has assumed a vertical posture which signifies a delimiter between characters, the motion language "immediately" is expressed. The rotational position of each joint actuator which defines the motion pattern corresponding to that of the motion language "immediately" and the time-series change in a joint angle for proceeding from the vertical posture to this motion pattern are accumulated in the motion language database 233, and are transmitted to the movement controlling module 300 through the movement output controller 234.

Then, after the robot 100 has assumed a vertical posture which signifies a delimiter between characters, the next motion language "come" is expressed. The rotational position of each joint actuator which defines the motion pattern corresponding to that of the motion language "come" and the time-series change in a joint angle for proceeding from the vertical posture to this motion pattern are accumulated in the motion language database 233, and are transmitted to the movement controlling module 300 through the movement output controller 234.

Lastly, the motion pattern of raising the left hand is executed in order to indicate to an external device or the like the end of the realization of the motion language.

Although in the example shown in FIG. 12 the robot 100 is made to assume a vertical posture which signifies a delimiter between characters, whether or not to insert a delimiter between motion languages is optional (as in the description above). It is not always necessary to express the delimiter between motion languages by a vertical posture, so that other postures may be used to express the delimiter.

Figure 13:
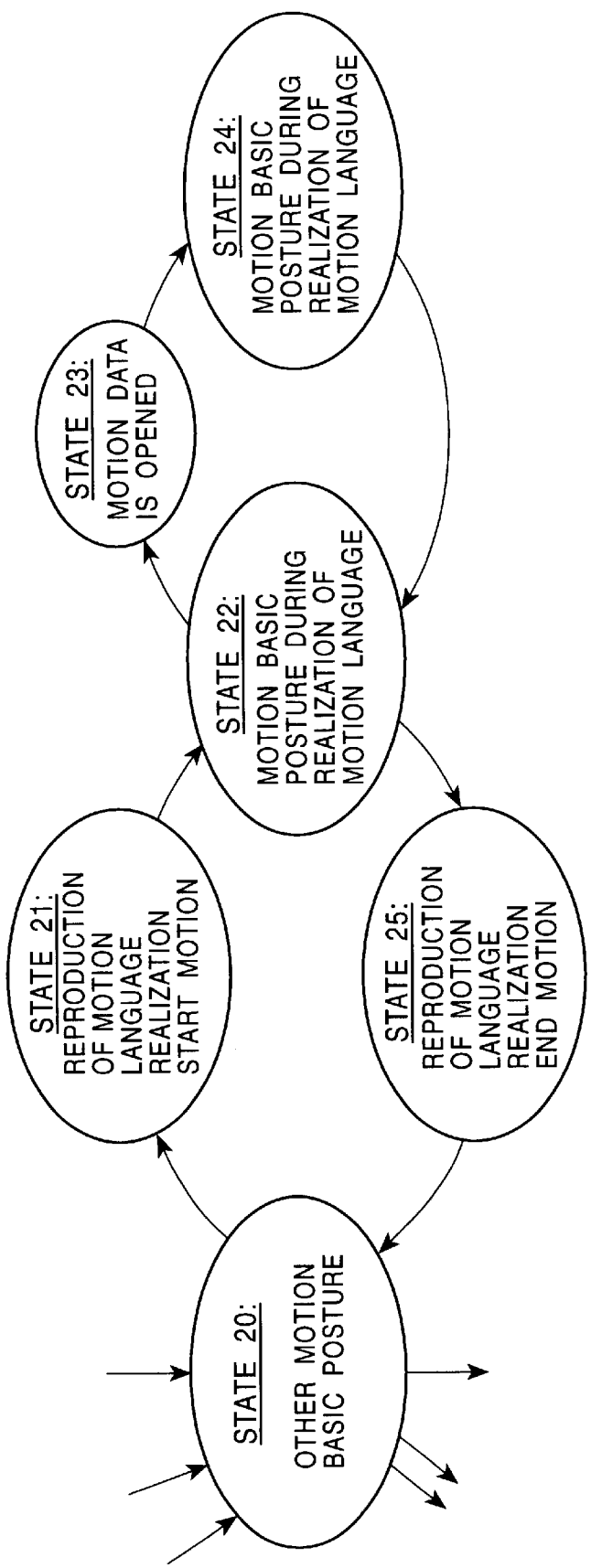
FIG. 13 illustrates in the form of transitions from one state to another the procedures for expressing the communication message "Come immediately" which is expressed in accordance with the method used to realize communication by a motion which has a meaning or a time-series change in a joint angle.

FIG. 13 illustrates in the form of transitions from one state to another the procedures for realizing the motion languages "Come immediately" in accordance with the method used to realize communication by motions which have meanings or based on time-series changes in an actuator angle.

In State 20 in which another basic posture is assumed, the command analyzer 231 analyzes an external command. Then, the motion languages "Come immediately" which realize a communication by motions which have meanings or based on time-series changes in actuator angles are issued to the communication controller 232. Each of the motion languages "immediately" and "come" is buffered in that order.

When a motion expression command is issued, the robot temporarily stops the task now being executed. The state changes to State 21 to in order to reproduce a motion language realization start motion. In the example shown in FIG. 12, the motion language realization start motion corresponds to the raising of the right hand. By reading out the proper motion data from the motion language database 233, and transmitting this to the movement controlling module 300, the motion language realization start motion is reproduced.

When the reproduction of the motion language realization start motion is completed, the state changes to State 22 in order to realize a movement basic posture during the realization of the motion language. The movement basic posture corresponds to the vertical posture in the example shown in FIG. 12, and is a delimiter between motion languages.

At this time, a confirmation is made as to whether the content of the buffer which has received a realization command corresponds to the motion languages "Come immediately." Then, the motion language "immediately" is taken out therefrom in order for the state to change to State 23.

In State 23, the motion data which corresponds to that of the motion language "immediately" is read out from the motion language data base 233, and is transmitted to the movement controlling module 300. Then, the state changes to State 24 in order to reproduce this motion language realization motion.

When the reproduction of this motion language realization motion is completed, the state is restored to State 22. By executing the movement basic posture during the realization of the motion language, the delimiter between motion languages is indicated. Thereafter, a confirmation is made on the content of the buffer which stores the realization command in order to take out the next motion language "come," after which the state changes to State 23 in order to reproduce the next motion language realization motion.

The reproduction of the motion language realization motion is repeated until all of the letters (or the motion languages) in the buffer which stores the realization commands have been processed. Therefore, in the example shown in FIG. 12, the motion languages "immediately" and "come" are successively formed in that order.

When the motion languages have been read out from the buffer which stores the realization commands, and the reproduction of the motion language realization motions of these languages has been completed, the state changes to State 25 via the movement basic posture (that is, the vertical posture) in State 22.

In State 25, a motion language realization end motion which indicates that the realization of the motion languages is completed is reproduced. In the example shown in FIG. 12, the motion language realization end motion corresponds to the raising of the left hand. By reading out the corresponding motion data from the motion language database 233, and transmitting this to the movement controlling module 300, the motion language realization end motion is reproduced.

Then, the state is restored to State 20 in order to reproduce the movement basic posture just before the issuance of the motion language realization command. In other words, the robot can restart the execution of the task which was temporarily stopped.

Figure 14:
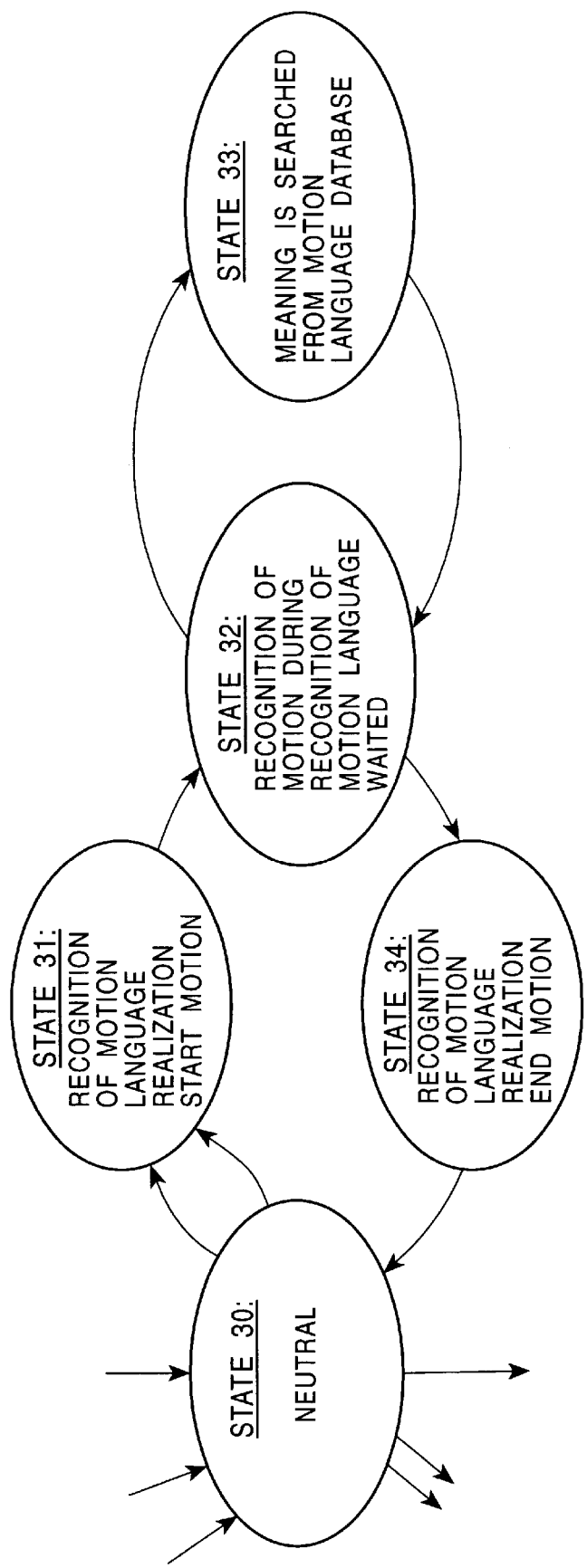
FIG. 14 illustrates in the form of transitions from one state to another the procedures for recognizing the communication message "Come immediately" which is expressed in accordance with the method used to realize communication by a motion which has a meaning or a time-series change in a joint angle.

For example, an external device (such as another robot) having a similar motion language database can visually recognize the motion language illustrated in FIG. 12. FIG. 14 illustrates in the form of transitions from one state to another the procedures for recognizing the communication message "Come immediately" which is formed in accordance with the method used to realize a communication by motions having meanings or based on time-series changes in joint actuator angles.

In State 30 prior to the recognition of the motion languages, the movement of the legged mobile robot 100 which realizes the motion languages is visually observed using, for example, a camera. When the motion is recognized, the state changes to State 31 in order to recognize the motion language realization start motion. When the start motion (which corresponds to the raising of the right hand in the example shown in FIG. 12) stored in the motion language database, and an image input through the camera are compared, and do not match, the state returns to State 30 to perform a waiting operation.

On the other hand, when the motion language realization start motion and the image are compared and match, the state changes to State 32 in response to the completion of the reproduction of the motion language realization start motion. In State 32, a motion other than the motion during the recognition of the motion languages is recognized. When this motion differs from the motion language end motion (which corresponds to the raising of the left hand in the example shown in FIG. 12), the state changes to State 33.

In State 33, the motion language database is searched in order to determine the motion language (which in this case is a movement which has a meaning) which corresponds to that of the recognized motion.

The recognized motion language is temporarily stored. The state returns to State 32 in order to execute the operation for recognizing the motion and the operation for determining the motion languages. In the example illustrated in FIG. 12, the motion language "immediately" is determined. Then, the motion language to be determined is successively added to the end of the motion language. As a result, the communication message "Come immediately" which is made up of at least two motion languages is obtained.

In State 32, when a motion other than the motion during the recognition of the motion language is recognized, and a determination is made that the motion corresponds to the motion language end motion (which corresponds to the raising of the left hand in the example shown in FIG. 12), the state changes to State 34 in order to set the recorded character string (that is, the motion languages "Come immediately" in the example shown in FIG. 12) as a return value, after which the state is restored to State 30.

When the side which recognizes the motion languages is of the same type as the legged mobile robot 100, the communication controller 232 may make a decision in response to the obtainment of a word which has a meaning as a return value. In accordance with the decision made, the movement controlling module 300 may be directed to execute the motion pattern (in this case, running with small steps toward the side which expresses the motion languages, etc.) in response to a sound output or an input communication.

The present invention has been described in detail with reference to a particular embodiment. However, it is obvious that modifications and substitutions may be made by those skilled in the art without departing from the gist of the present invention. In other words, the present invention has been described in various forms for illustrative purposes only. Therefore, it is to be understood that the present invention is not limited thereto. In order to determine the gist of the present invention, one should refer to the claims of the present invention below.

As described in detail above, according to the present invention, it is possible to provide an excellent legged robot which can communicate by moving the limbs and/or the trunk, and a method of controlling the motion of the legged robot.

According to the present invention, it is possible to provide an excellent legged robot which can come to an understanding with, for example, a robot with which a connection is not established through a data transmission medium, using various motion patterns which make use of the limbs and/or the trunk, and a method of controlling the motion of the legged robot.

According to the present invention, the legged mobile robot can communicate by moving the four limbs thereof. Such a form of communication by such a movement makes it possible for the robot to communicate with or come to an understanding with a robot which is not connected through a transmission medium used for electronically transmitting data.

According to the present invention, the form of communication based on the movement of the legged mobile robot makes it possible for a motion pattern itself which realizes the communication to realize languages. Therefore, even in the case where a protocol for defining the meaning of the motion pattern or a method of interpreting it, and connection using a communications circuit are not established between the robots, when the motion pattern which is executed by a first robot is visually followed by a second robot, and an analysis based on the ordinary judgment of a human being which he/she possesses by nature is executed, the second robot can guess what the first robot intended to communicate.

According to the form of communication by a motion of the legged mobile robot of the present invention, the motion pattern itself which realizes the communication can realize languages, and the motion pattern which can be interpreted based on the ordinary judgment of a human being which he/she possesses by nature is used. Therefore, the robot can come to an understanding with a human being in addition to a mechanical device which interprets electronic data, such as a robot. For example, a robot which has stepped into a dangerous working area can visually notify, for example, the state of the working place to a human being who is observing/watching the robot from a remote place, without using any data communications means, such as a wired or radio data communications means (or without having to wait for the establishment of a communications connection).

What is claimed is:

1. An articulated robot which comprises a plurality of joints, the articulated robot including:
    a movement controller for controlling the movement of each of the joints;
    a motion language accumulator for accumulating a motion language formed by a motion pattern of the joints, the motion patterns being executed to express the intentions and details of communication; and
    a movement output controller for giving the motion language to be used to the movement controller as a result of taking the motion language to be used from the motion language accumulator.

2. An articulated robot according to claim 1, further including an external interface used for performing operations including an image input operation, a sound input/output operation, and a data transmission/reception operation through a communications medium, and a communication controller for controlling the communication based on input/output data through the external interface, wherein the communication controller determines the motion language to be used in accordance with the details of the communication.

3. An articulated robot according to claim 1, wherein the motion language is realized using a method which forms a sentence by repeating the formation of a plurality of characters with the basic mode of formation being in character units, or by using a method which realizes the communication by a motion which has a meaning or based on a time-series change in a joint angle.

4. An articulated robot according to claim 1, wherein a plurality of motion languages are combined to express the intentions of the robot or the details of the communication, and wherein the motion language accumulator includes a motion pattern used to direct the starting of the realization of the motion language, and/or a motion pattern used to direct the ending of the realization of the motion language.

5. An articulated robot according to claim 1, wherein a plurality of motion languages are combined to express the intentions of the robot or the details of the communication, and the motion language accumulator includes a motion pattern used for directing the provision of a delimiter between the motion languages.

6. An articulated robot according to claim 1, further including a movement teaching section for directly teaching the motion pattern which is executed to realize the motion language as a result of directly holding and operating each of the joints.

7. An articulated robot according to claim 1, further including a movement teaching section for indirectly teaching the motion pattern which is executed to realize the motion language as a result of actuating each of the joints along a coordinate system of the robot.

8. A method of controlling the motion of an articulated robot which comprises a plurality of joints and which accumulates a motion language which is formed by a motion pattern of each of the joints used to express the intentions of the robot and the details of communication, the method comprising the steps of:
    determining the motion language to be used; and
    controlling the movement of each of the joints for realizing the determined motion language.

9. A method of controlling the motion of an articulated robot according to claim 8, further comprising the steps of inputting and outputting data to the outside through a communications medium, the inputting and outputting of data including inputting of an image, inputting/outputting of sound, and transmitting/receiving of data, and of controlling communication based on the data input/output operation, wherein the motion language to be used is determined in accordance with the details of the communication.

10. A method of controlling the motion of an articulated robot according to claim 8, wherein the motion language is realized using a method which forms a sentence by repeating the formation of a plurality of characters with the basic mode of formation being in character units, or by using a method which realizes the communication by a motion which has a meaning or based on a time-series change in a joint angle.

11. A method of controlling the motion of an articulated robot according to claim 8, further comprising the step of executing a motion pattern used to direct the starting of the realization of the motion language and/or the step of executing the motion pattern used to direct the ending of the realization of the motion language.

12. A method of controlling the motion of an articulated robot according to claim 8 further comprising the step of, when the intentions of the robot or details of the communication are expressed by combining a plurality of the motion languages, executing a motion pattern used to direct the provision of a delimiter between the motion languages.

13. A method of controlling the motion of an articulated robot according to claim 8, further comprising the step of directly teaching the motion pattern which is executed to realize the motion language as a result of directly holding and operating each of the joints.

14. A method of controlling the motion of an articulated robot according to claim 8, further comprising the step of indirectly teaching the motion pattern which is executed to realize the motion language as a result of actuating each of the joints along a coordinate system of the robot.

* * * * *